United States Patent
Grimm et al.

(10) Patent No.: US 12,460,936 B2
(45) Date of Patent: Nov. 4, 2025

(54) PROPULSION STRESS AWARE NAVIGATION ROUTING

(71) Applicant: GM Global Technology Operations LLC, Detroit, MI (US)

(72) Inventors: Donald K. Grimm, Utica, MI (US); Talus Park, Dexter, MI (US); Ante Gojsalic, Zagreb (HR); Josip Kovačvić, Nasice (HR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 469 days.

(21) Appl. No.: 18/062,772

(22) Filed: Dec. 7, 2022

(65) Prior Publication Data
US 2024/0192001 A1 Jun. 13, 2024

(51) Int. Cl.
*G01C 21/34* (2006.01)
*G01C 21/00* (2006.01)

(52) U.S. Cl.
CPC ..... *G01C 21/3453* (2013.01); *G01C 21/3896* (2020.08)

(58) Field of Classification Search
CPC .......... G01C 21/3896; G01C 21/3453
USPC ........................................................ 701/420
See application file for complete search history.

(56) References Cited

U.S. PATENT DOCUMENTS

| | | | |
|---|---|---|---|
| 10,331,141 B2* | 6/2019 | Grimm | G01C 21/3407 |
| 2021/0394792 A1* | 12/2021 | Ahmad | H04W 4/46 |
| 2023/0276209 A1* | 8/2023 | Knopp | H04W 4/027 |
| | | | 370/259 |
| 2023/0306843 A1* | 9/2023 | Knopp | G08G 1/22 |
| 2024/0275506 A1* | 8/2024 | Bandi | H04B 17/345 |

OTHER PUBLICATIONS

U.S. Appl. No. 16/983,505, filed Aug. 3, 2020.

* cited by examiner

*Primary Examiner* — Yazan A Soofi
(74) *Attorney, Agent, or Firm* — Vivacqua Crane, PLLC

(57) ABSTRACT

A system for routing a vehicle based on roadway characteristics includes a global navigation satellite system (GNSS) for determining a geographical location of the vehicle, a vehicle communication system for communicating with server systems, and a vehicle controller in electrical communication with the GNSS and the vehicle communication system. The vehicle controller is programmed to determine a vehicle mass, vehicle height, and vehicle width and receive a navigation request from an occupant of the vehicle. The vehicle controller is further programmed to determine a navigation route using at least the GNSS and the vehicle communication system in response to receiving the navigation request. The navigation route is based at least in part on the vehicle mass, vehicle height, and vehicle width.

18 Claims, 5 Drawing Sheets

PROPULSION STRESS AWARE NAVIGATION ROUTING

INTRODUCTION

The present disclosure relates to systems and methods for navigation routing for a vehicle.

To increase occupant awareness and convenience, vehicles may be equipped with navigation systems which are configured to provide navigation directions to assist the occupant in navigating to a destination. Navigation systems may use satellite-based radio communication to determine a location of the vehicle and use local or cloud-based maps to determine a route to the destination. When multiple routes are available, the navigation system may consider various factors, for example, route time, route length, traffic congestion, and fuel consumption to select an optimum or preferred route. However, current navigation systems may fail to account for additional factors which may affect occupant experience. Additionally, navigation systems may alert occupants of hazards present along a route, for example, railroad crossings or school zones. However, current navigation systems may fail to alert occupants of additional hazards.

Thus, while current navigation systems and methods achieve their intended purpose, there is a need for a new and improved system and method for navigation routing for a vehicle.

SUMMARY

According to several aspects, a system for routing a vehicle based on roadway characteristics is provided. The system includes a global navigation satellite system (GNSS) for determining a geographical location of the vehicle, a vehicle communication system for communicating with server systems, and a vehicle controller in electrical communication with the GNSS and the vehicle communication system. The vehicle controller is programmed to determine a vehicle mass, vehicle height, and vehicle width and receive a navigation request from an occupant of the vehicle. The vehicle controller is further programmed to determine a navigation route using at least the GNSS and the vehicle communication system in response to receiving the navigation request. The navigation route is based at least in part on the vehicle mass, vehicle height, and vehicle width.

In another aspect of the present disclosure, to determine the vehicle mass, vehicle height, and vehicle width, the vehicle controller is further programmed to retrieve a predetermined mass of the vehicle, a predetermined height of the vehicle, and a predetermined width of the vehicle from a non-transitory memory of the vehicle controller. To determine the vehicle mass, vehicle height, and vehicle width, the vehicle controller is further programmed to determine a towing status of the vehicle. The towing status includes a trailering status and a non-trailering status. To determine the vehicle mass, vehicle height, and vehicle width, the vehicle controller is further programmed to prompt the occupant of the vehicle to provide a trailer weight, a trailer height, and a trailer width in response to determining that the towing status is the trailering status. To determine the vehicle mass, vehicle height, and vehicle width, the vehicle controller is further programmed to determine the vehicle mass to be the predetermined mass of the vehicle, the vehicle height to be the predetermined height of the vehicle, and the vehicle width to be the predetermined width of the vehicle in response to determining that the trailering status is the non-trailering status. To determine the vehicle mass, vehicle height, and vehicle width, the vehicle controller is further programmed to determine the vehicle mass to be a sum of the predetermined mass of the vehicle and the trailer weight, the vehicle height to be the larger of the predetermined height of the vehicle and the trailer height, and the vehicle width to be the larger of the predetermined width of the vehicle and the trailer width in response to determining that the trailering status is the trailering status.

In another aspect of the present disclosure, to determine the navigation route, the vehicle controller is further programmed to determine the geographical location of the vehicle using the GNSS. To determine the navigation route, the vehicle controller is further programmed to transmit the geographical location of the vehicle, the navigation request, the vehicle mass, the vehicle height, and the vehicle width to a server controller using the vehicle communication system. To determine the navigation route, the vehicle controller is further programmed to receive the navigation route from the server controller using the vehicle communication system.

In another aspect of the present disclosure, the server controller is programmed to determine a plurality of possible routes based at least in part on the geographical location of the vehicle. Each of the plurality of possible routes satisfies the navigation request. The server controller is programmed to determine a route propulsion comfort score for each of the plurality of possible routes. The server controller is programmed to select the navigation route from the plurality of possible routes based at least in part on the route propulsion comfort score for each of the plurality of possible routes.

In another aspect of the present disclosure, the server controller is in electrical communication with a database. The database contains a plurality of segment propulsion comfort records, each of the plurality of segment propulsion comfort records corresponding to one of a plurality of road segments of a plurality of roadways. Each of the plurality of segment propulsion comfort records has a location attribute, a vehicle class attribute, and a propulsion comfort score attribute.

In another aspect of the present disclosure, to determine the route propulsion comfort score for each of the plurality of possible routes, the server controller is further programmed to determine a vehicle class of the vehicle based at least in part on the vehicle mass, the vehicle height, and the vehicle width. To determine the route propulsion comfort score for each of the plurality of possible routes, the server controller is further programmed to retrieve a subset of the plurality of segment propulsion comfort records from the database. The location of each of the subset of the plurality of segment propulsion comfort records is located along one of the plurality of possible routes. The vehicle class of each of the subset of the plurality of segment propulsion comfort records matches the vehicle class of the vehicle. To determine the route propulsion comfort score for each of the plurality of possible routes, the server controller is further programmed to determine the route propulsion comfort score for each of the plurality of possible routes by summing the propulsion comfort score of each of the subset of the plurality of segment propulsion comfort records along each of the plurality of possible routes.

In another aspect of the present disclosure, the database is populated by generating the plurality of segment propulsion comfort records. To generate one of the plurality of segment propulsion comfort records, the server controller is further programmed to receive one of a plurality of performance data sets for one of the plurality of road segments from at least one vehicle. To generate one of the plurality of segment propulsion comfort records, the server controller is further programmed to determine a vehicle class of the at least one vehicle. To generate one of the plurality of segment propulsion comfort records, the server controller is further programmed to calculate one of a plurality of normalized performance data sets by normalizing the one of the plurality of performance data sets. To generate one of the plurality of segment propulsion comfort records, the server controller is further programmed to calculate one of a plurality of weighted normalized performance data sets by multiplying the one of the plurality of normalized performance data sets by a plurality of predetermined weights. To generate one of the plurality of segment propulsion comfort records, the server controller is further programmed to generate the one of the plurality of segment propulsion comfort records. The location of the one of the plurality of segment propulsion comfort records is the location of the one of the plurality of road segments. The vehicle class of the one of the plurality of segment propulsion comfort records is the vehicle class of the at least one vehicle. The propulsion comfort score of the one of the plurality of segment propulsion comfort records is a sum of the one of the plurality of weighted normalized performance data sets.

In another aspect of the present disclosure, the server controller is further programmed to determine a route grade comfort score for each of the plurality of possible routes. The server controller is further programmed to select the navigation route from the plurality of possible routes based at least in part on the route propulsion comfort score and the route grade comfort score for each of the plurality of possible routes.

In another aspect of the present disclosure, to determine the route grade comfort score for each of the plurality of possible routes, the server controller is further programmed to retrieve a road speed limit and a road grade angle for each of the plurality of road segments. To determine the route grade comfort score for each of the plurality of possible routes, the server controller is further programmed to determine a segment grade comfort score for each of the plurality of road segments of each of the plurality of possible routes based at least in part on a vehicle power ratio for each of the plurality of road segments of each of the plurality of possible routes. To determine the route grade comfort score for each of the plurality of possible routes, the server controller is further programmed to determine the route grade comfort score for each of the plurality of possible routes based at least in part on the segment grade comfort score for each of the plurality of road segments of each of the plurality of possible routes.

In another aspect of the present disclosure, to calculate the vehicle power ratio for one of the plurality of road segments of the plurality of possible routes, the server controller is further programmed to determine a maximum power of a powertrain of the vehicle. To calculate the vehicle power ratio for one of the plurality of road segments of the plurality of possible routes, the server controller is further programmed to calculate an estimated power to traverse the one of the plurality of road segments of the plurality of possible routes using an estimated power model:

$$P_{est} = \left(\frac{C_d * \rho_a * v^3}{2}\right) * A + (C_{rr} * g * v) * M + (v * g * \sin\alpha) * M$$

where $P_{est}$ is the estimated power, $C_d$ is a coefficient of drag of the vehicle, $\rho_a$ is an air density in an environment surrounding the vehicle, $v$ is the road speed limit of the one of the plurality of road segments, A is a frontal cross-sectional area of the vehicle, $C_{rr}$ is a coefficient of rolling resistance of the vehicle, g is a gravitational constant, M is the vehicle mass, and $\alpha$ is the road grade angle of the one of the plurality of road segments. To calculate the vehicle power ratio for one of the plurality of road segments of the plurality of possible routes, the server controller is further programmed to calculate the vehicle power ratio for the one of the plurality of road segments of the plurality of possible routes by dividing the estimated power to traverse the one of the plurality of road segments of the plurality of possible routes by the maximum power of the powertrain of the vehicle.

According to several aspects, a method for routing a vehicle based on roadway characteristics is provided. The method includes populating a database with a plurality of records, each of the plurality of records corresponding to one of a plurality of road segments. Each of the plurality of records has a plurality of attributes. The method also includes determining a plurality of possible routes to satisfy a navigation request based at least in part on a location of the vehicle. Each of the plurality of possible routes includes a subset of the plurality of road segments. The method also includes selecting a navigation route from the plurality of possible routes based at least in part on the plurality of records.

In another aspect of the present disclosure, populating the database further may include receiving a plurality of performance data sets from a plurality of vehicles. Each of the plurality of performance data sets corresponds to one of the plurality of road segments. Populating the database further may include calculating a plurality of normalized weighted performance data sets by normalizing the plurality of performance data sets and multiplying each of the plurality of performance data sets by a plurality of predetermined weights. Populating the database further may include determining a vehicle class for each of the plurality of normalized weighted performance data sets based on a vehicle class of each of the plurality of vehicles. Populating the database further may include determining a road speed limit and road grade angle of each of the plurality of road segments. Populating the database further may include creating the plurality of records in the database. Each of the plurality of records corresponds to one of the plurality of road segments.

In another aspect of the present disclosure, a location attribute of each of the plurality of records is a location of the one of the plurality of road segments, a vehicle class attribute of each of the plurality of records is the vehicle class of the one of the normalized weighted performance data sets, a propulsion comfort score attribute of each of the plurality of records is based at least in part on the one of the plurality of normalized weighted performance data sets, a road speed limit attribute is the road speed limit of the one of the plurality of road segments, and a road grade angle attribute is the road grade angle of the one of the plurality of road segments.

In another aspect of the present disclosure, selecting the navigation route further may include determining a route propulsion comfort score for each of the plurality of possible routes based at least in part on the plurality of records in the database. Selecting the navigation route further may include determining a route grade comfort score for each of the plurality of possible routes based at least in part on the plurality of records in the database. Selecting the navigation route further may include selecting the navigation route from the plurality of possible routes based at least in part on the route propulsion comfort score for each of the plurality of possible routes and the route grade comfort score for each of the plurality of possible routes.

In another aspect of the present disclosure, determining the route propulsion comfort score for each of the plurality of possible routes further may include determining a vehicle class of the vehicle based at least in part on a vehicle mass, a vehicle height, and a vehicle width. Determining the route propulsion comfort score for each of the plurality of possible routes further may include retrieving a subset of the plurality of records from the database. The location of each of the subset of the plurality of records is located along one of the plurality of possible routes. The vehicle class of each of the subset of the plurality of records matches the vehicle class of the vehicle. Determining the route propulsion comfort score for each of the plurality of possible routes further may include determining the route propulsion comfort score for each of the plurality of possible routes by summing the propulsion comfort score of each of the subset of the plurality of records along each of the plurality of possible routes.

In another aspect of the present disclosure, determining the route grade comfort score for each of the plurality of possible routes further may include retrieving the road speed limit and the road grade angle for each of the plurality of road segments from the database. Determining the route grade comfort score for each of the plurality of possible routes further may include calculating a vehicle power ratio for each of the plurality of road segments of each of the plurality of possible routes. Determining the route grade comfort score for each of the plurality of possible routes further may include determining a segment grade comfort score for each of the plurality of road segments of each of the plurality of possible routes based at least in part on the vehicle power ratio for each of the plurality of road segments of each of the plurality of possible routes. Determining the route grade comfort score for each of the plurality of possible routes further may include determining the route grade comfort score for each of the plurality of possible routes based at least in part on the segment grade comfort score for each of the plurality of road segments of each of the plurality of possible routes.

In another aspect of the present disclosure, calculating a vehicle power ratio for each of the plurality of road segments further comprises determining a maximum power of a powertrain of the vehicle. Calculating a vehicle power ratio for each of the plurality of road segments further comprises calculating an estimated power to traverse the one of the plurality of road segments of the plurality of possible routes using an estimated power model:

$$P_{est} = \left(\frac{C_d * \rho_a * v^3}{2}\right) * A + (C_{rr} * g * v) * M + (v * g * \sin\alpha) * M$$

where $P_{est}$ is the estimated power, $C_d$ is a coefficient of drag of the vehicle, $\rho_a$ is an air density in an environment surrounding the vehicle, $v$ is the road speed limit of the one of the plurality of road segments, $A$ is a frontal cross-sectional area of the vehicle, $C_{rr}$ is a coefficient of rolling resistance of the vehicle, $g$ is a gravitational constant, $M$ is the vehicle mass, and $\alpha$ is the road grade angle of the one of the plurality of road segments. Calculating a vehicle power ratio for each of the plurality of road segments further comprises calculating the vehicle power ratio for the one of the plurality of road segments of the plurality of possible routes by dividing the estimated power to traverse the one of the plurality of road segments of the plurality of possible routes by the maximum power of the powertrain of the vehicle.

According to several aspects, a system for routing a vehicle based on roadway characteristics is provided. The system includes a global navigation satellite system (GNSS) for determining a geographical location of the vehicle, a vehicle communication system for communicating with server systems, a plurality of vehicle sensors for measuring a plurality of performance data of the vehicle, and a vehicle controller in electrical communication with the GNSS, the vehicle communication system, and the plurality of vehicle sensors. The vehicle controller is programmed to determine a vehicle mass, vehicle height, and vehicle width. The vehicle controller is further programmed to receive a navigation request from an occupant of the vehicle. The vehicle controller is further programmed to determine the geographical location of the vehicle using the GNSS. The vehicle controller is further programmed to measure a performance data set of the vehicle using the plurality of vehicle sensors transmit the geographical location of the vehicle, the navigation request, the vehicle mass, the vehicle height, the vehicle width, and the performance data set to a server controller using the vehicle communication system. The server controller is programmed to determine a plurality of possible routes based at least in part on the geographical location of the vehicle. Each of the plurality of possible routes satisfies the navigation request and each of the plurality of possible routes includes a plurality of road segments. The server controller is further programmed to determine a route propulsion comfort score for each of the plurality of possible routes. The server controller is further programmed to determine a route grade comfort score for each of the plurality of possible routes. The server controller is further programmed to select a navigation route from the plurality of possible routes based at least in part on the route propulsion comfort score for each of the plurality of possible routes and the route grade comfort score for each of the plurality of possible routes.

In another aspect of the present disclosure, to determine the route propulsion comfort score for each of the plurality of possible routes the server controller is further programmed to determine a vehicle class of the vehicle based at least in part on the vehicle mass, the vehicle height, and the vehicle width. To determine the route propulsion comfort score for each of the plurality of possible routes the server controller is further programmed to retrieve a plurality of segment propulsion comfort records from a database. The location of each of the plurality of segment propulsion comfort records is located along one of the plurality of possible routes. Each of the plurality of segment propulsion comfort records corresponds to one of the plurality of road segments. The vehicle class of each of the plurality of segment propulsion comfort records matches the vehicle class of the vehicle. To determine the route propulsion comfort score for each of the plurality of possible routes the server controller is further programmed to determine the route propulsion comfort score for each of the plurality of possible routes by summing the propulsion comfort score of each of the plurality of segment propulsion comfort records along each of the plurality of possible routes. To determine a route grade comfort score for each of the plurality of possible routes, the server controller is further programmed to retrieve a road speed limit and a road grade angle for each of the plurality of road segments from the database. To determine a route grade comfort score for each of the plurality of possible routes, the server controller is further programmed determine a segment grade comfort score for each of the plurality of road segments of each of the plurality of possible routes based at least in part on a vehicle power ratio for each of the plurality of road segments of each of the plurality of possible routes. To determine a route grade comfort score for each of the plurality of possible routes, the server controller is further programmed determine the route grade comfort score for each of the plurality of possible routes based at least in part on the segment grade comfort score for each of the plurality of road segments of each of the plurality of possible routes.

In another aspect of the present disclosure, the database is populated by generating a plurality of segment propulsion comfort records. To generate one of the plurality of segment propulsion comfort records, the server controller is further programmed to receive one of a plurality of performance data sets for one of the plurality of road segments from at least one vehicle. To generate one of the plurality of segment propulsion comfort records, the server controller is further programmed to determine a vehicle class of the at least one vehicle. To generate one of the plurality of segment propulsion comfort records, the server controller is further programmed to calculate one of a plurality of normalized performance data sets by normalizing the one of the plurality of performance data sets. To generate one of the plurality of segment propulsion comfort records, the server controller is further programmed to calculate one of a plurality of weighted normalized performance data sets by multiplying the one of the plurality of normalized performance data sets by a plurality of predetermined weights. To generate one of the plurality of segment propulsion comfort records, the server controller is further programmed to generate the one of the plurality of segment propulsion comfort records, wherein the location of the one of the plurality of segment propulsion comfort records is the location of the one of the plurality of road segments, wherein the vehicle class of the one of the plurality of segment propulsion comfort records is the vehicle class of the at least one vehicle, and wherein the propulsion comfort score of the one of the plurality of segment propulsion comfort records is a sum of the one of the plurality of weighted normalized performance data sets.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

When operating a vehicle, an occupant may encounter road configurations and/or situations (e.g., roadways having a steep grade angle, roadways requiring merging into higher speed traffic), which cause stress on a propulsion and/or braking system of the vehicle and thus discomfort to the occupant. Using the system and method of the present disclosure, vehicle navigation systems may account for characteristics of the vehicle and road configurations to provide optimized routes to the occupant, improving occupant experience and comfort.

Figure 1:
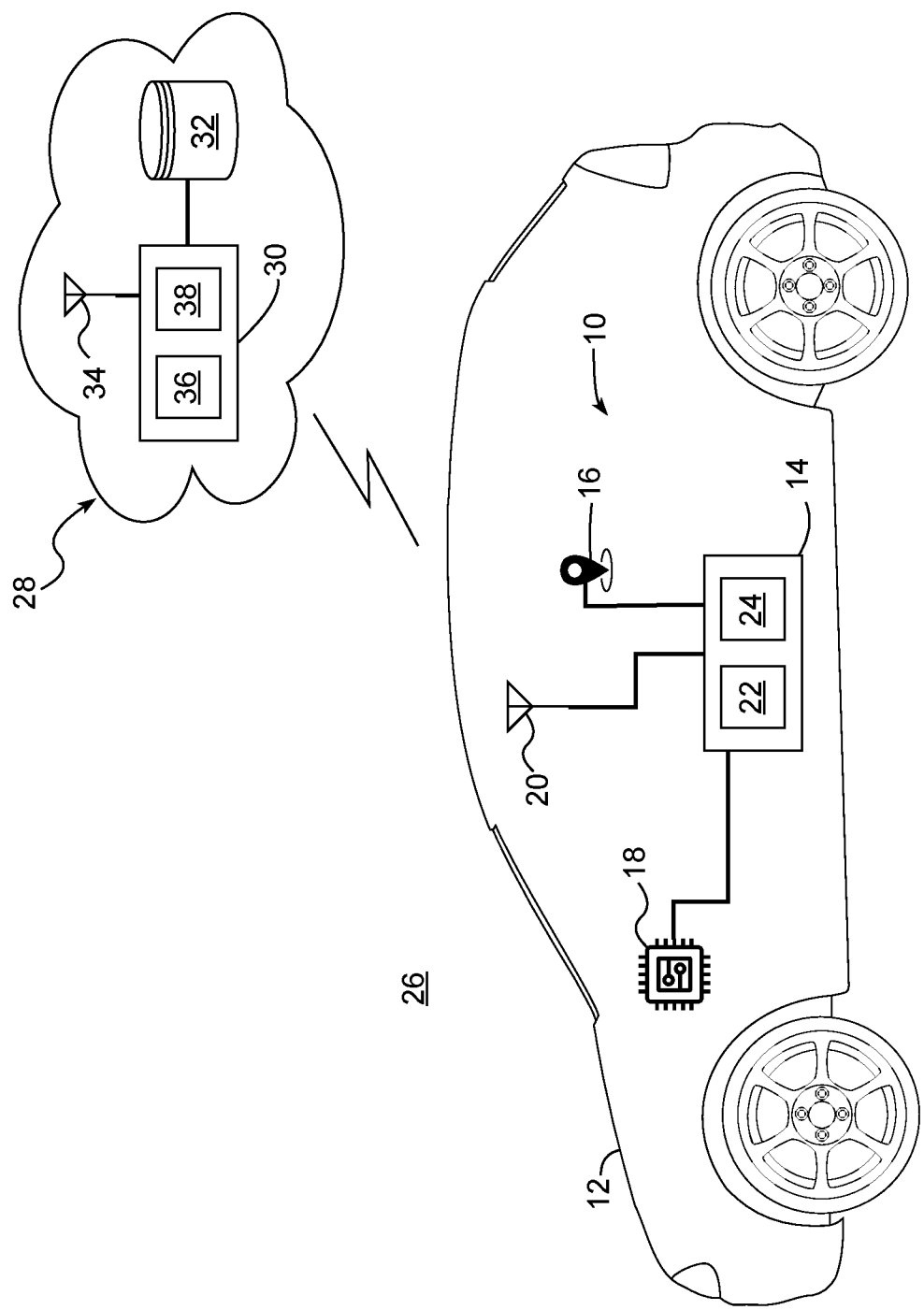
FIG. 1 is a schematic diagram of a system for routing a vehicle based on roadway characteristics according to an exemplary embodiment.

Referring to FIG. 1, a system for routing a vehicle based on roadway characteristics is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a vehicle controller 14, a global navigation satellite system (GNSS) 16, a plurality of vehicle sensors 18, and a vehicle communication system 20.

The vehicle controller 14 is used to implement a method 100 for routing a vehicle based on roadway characteristics, as will be described below. The vehicle controller 14 includes at least one processor 22 and a non-transitory computer readable storage device or media 24. The processor 22 may be a custom made or commercially available processor, a central processing unit (CPU), a graphics processing unit (GPU), an auxiliary processor among several processors associated with the vehicle controller 14, a semiconductor-based microprocessor (in the form of a microchip or chip set), a macroprocessor, a combination thereof, or generally a device for executing instructions. The computer readable storage device or media 24 may include volatile and nonvolatile storage in read-only memory (ROM), random-access memory (RAM), and keep-alive memory (KAM), for example. KAM is a persistent or non-volatile memory that may be used to store various operating variables while the processor 22 is powered down. The computer-readable storage device or media 24 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 14 to control various systems of the vehicle 12. The vehicle controller 14 may also consist of multiple controllers which are in electrical communication with each other. The vehicle controller 14 may be inter-connected with additional systems and/or controllers of the vehicle 12, allowing the vehicle controller 14 to access data such as, for example, speed, acceleration, braking, and steering angle of the vehicle 12.

The vehicle controller 14 is in electrical communication with the global navigation satellite system (GNSS) 16, the plurality of vehicle sensors 18, and the vehicle communication system 20. In an exemplary embodiment, the electrical communication is established using, for example, a CAN bus, a Wi-Fi network, a cellular data network, or the like. It should be understood that various additional wired and wireless techniques and communication protocols for communicating with the vehicle controller 14 are within the scope of the present disclosure.

The GNSS 16 is used to determine a geographical location of the vehicle 12. In an exemplary embodiment, the GNSS 16 is a global positioning system (GPS). In a non-limiting example, the GPS includes a GPS receiver antenna (not shown) and a GPS controller (not shown) in electrical communication with the GPS receiver antenna. The GPS receiver antenna receives signals from a plurality of satellites, and the GPS controller calculates the geographical location of the vehicle 12 based on the signals received by the GPS receiver antenna. In an exemplary embodiment, the GNSS 16 additionally includes a GNSS map. The GNSS map includes information about infrastructure such as municipality borders, roadways, railways, sidewalks, buildings, and the like. Therefore, the geographical location of the vehicle 12 is contextualized using the GNSS map information. In a non-limiting example, the GNSS map is retrieved from a remote source using a wireless connection. In another non-limiting example, the GNSS map is stored in a memory of the GNSS 16. It should be understood that various additional types of satellite-based radionavigation systems, such as, for example, the Global Positioning System (GPS), Galileo, GLONASS, and the BeiDou Navigation Satellite System (BDS) are within the scope of the present disclosure.

The plurality of vehicle sensors 18 is used to determine performance data about the vehicle 12. In an exemplary embodiment, the plurality of vehicle sensors 18 includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of vehicle sensors further includes sensors to determine information about an environment surrounding the vehicle 12, for example, an ambient air temperature sensor, a barometric pressure sensor, and/or a photo and/or video camera which is positioned to view the environment 26 in front of the vehicle 12. In another exemplary embodiment, at least one of the plurality of vehicle sensors 18 is capable of measuring distances in the environment 26 surrounding the vehicle 12. In a non-limiting example wherein the plurality of vehicle sensors 18 includes a camera, the plurality of vehicle sensors 18 measures distances using an image processing algorithm configured to process images from the camera and determine distances between objects. In another non-limiting example, the plurality of vehicle sensors 18 includes a stereoscopic camera having distance measurement capabilities. In one example, at least one of the plurality of vehicle sensors 18 is affixed inside of the vehicle 12, for example, in a headliner of the vehicle 12, having a view through a windscreen of the vehicle 12. In another example, at least one of the plurality of vehicle sensors 18 is affixed outside of the vehicle 12, for example, on a roof of the vehicle 12, having a view of the environment 26 surrounding the vehicle 12. It should be understood that various additional types of vehicle sensors, such as, for example, LiDAR sensors, ultrasonic ranging sensors, radar sensors, and/or time-of-flight sensors are within the scope of the present disclosure.

The vehicle communication system 20 is used by the vehicle controller 14 to communicate with other systems external to the vehicle 12. For example, the vehicle communication system 20 includes capabilities for communication with other vehicles ("V2V" communication), infrastructure ("V2I" communication), remote systems at a remote call center (e.g., ON-STAR by GENERAL MOTORS) and/or personal devices. In general, the term vehicle-to-everything communication ("V2X" communication) refers to communication between the vehicle 12 and any remote system (e.g., vehicles, infrastructure, and/or remote systems). In certain embodiments, the vehicle communication system 20 is a wireless communication system configured to communicate via a wireless local area network (WLAN) using IEEE 802.11 standards or by using cellular data communication. However, additional or alternate communication methods, such as a dedicated short-range communications (DSRC) channel and/or mobile telecommunications protocols based on the $3^{rd}$ Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure. Accordingly, the vehicle communication system 20 may include one or more antennas and/or communication transceivers for receiving and/or transmitting signals, such as cooperative sensing messages (CSMs). The vehicle communication system 20 is configured to wirelessly communicate information between the vehicle 12 and another vehicle. Further, the vehicle communication system 20 is configured to wirelessly communicate information between the vehicle 12 and infrastructure or other vehicles.

With continued reference to FIG. 1, a server system is illustrated and generally indicated by reference number 28. The server system 28 includes a server controller 30 in electrical communication with a database 32 and a server communication system 34. In a non-limiting example, the server system 28 is located in a server farm, datacenter, or the like, and connected to the internet. The server controller 30 includes at least one server processor 36 and a server non-transitory computer readable storage device or server media 38. The description of the type and configuration given above for the vehicle controller 14 also applies to the server controller 30. The description given above for the vehicle communication system 20 also applies to the server communication system 34. The server communication system 34 is used to communication with external systems, such as, for example, the vehicle controller 14 via the vehicle communication system 20.

Figure 2:
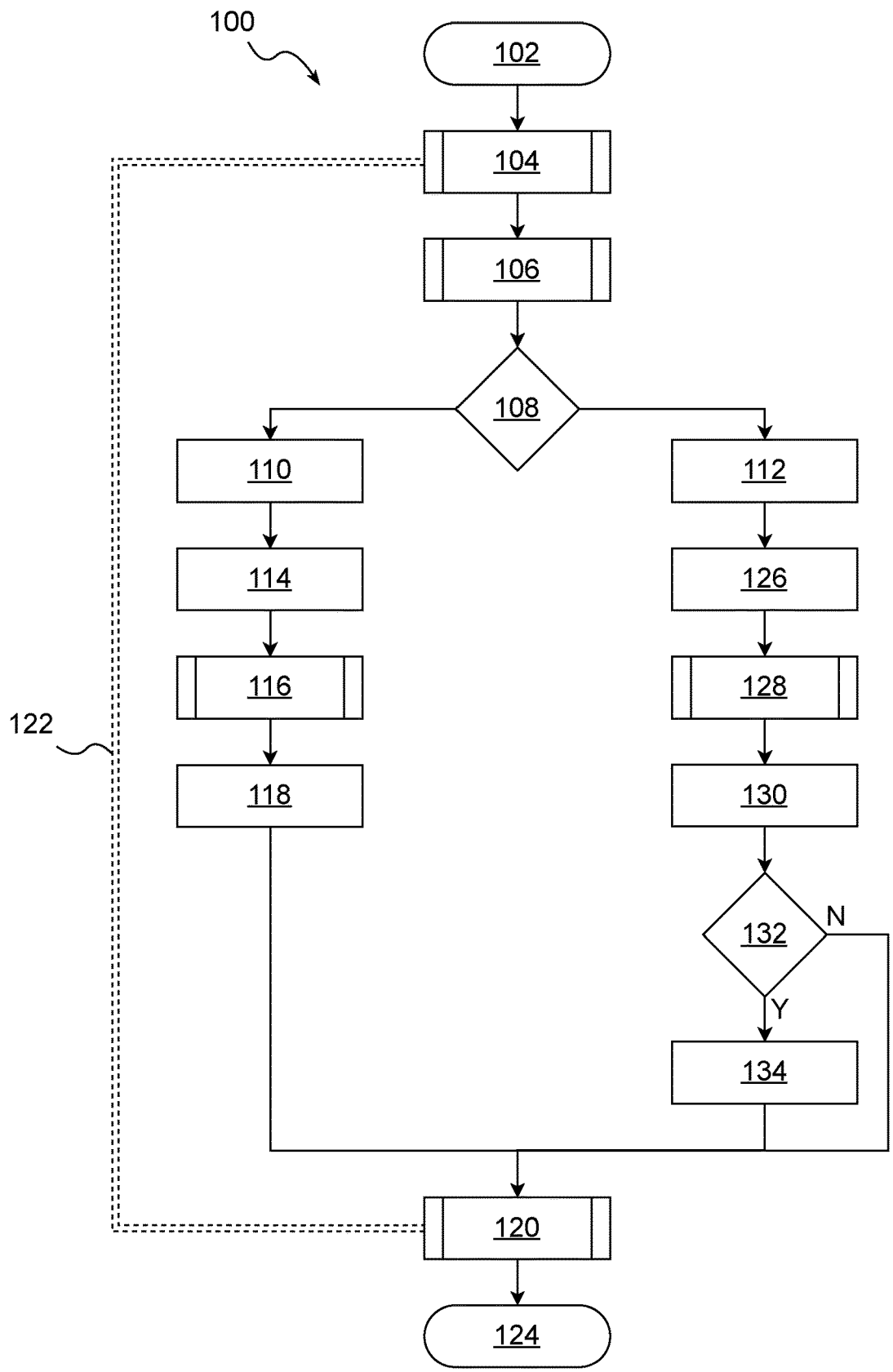
FIG. 2 is a flowchart of a method for routing a vehicle based on roadway characteristics according to an exemplary embodiment.

Referring to FIG. 2, a flowchart of the method 100 for routing a vehicle based on roadway characteristics is shown. The method 100 begins at block 102 and proceeds to block 104. At block 104, the server system 28 populates the database 32 with a plurality of segment propulsion comfort records. In the scope of the present disclosure, all roadways are divided into a plurality of road segments, each road segment including a segment of the roadway having a predetermined length (e.g., five-hundred meters). Thus, each road segment has a location, and attributes of the road segment may be defined, such as, for example, a road grade angle of the road segment. In the scope of the present disclosure, each of the plurality of segment propulsion comfort records corresponds to one of the plurality of road segments. The plurality of segment propulsion comfort records will be discussed in greater detail below. An exemplary embodiment of block 104 will be discussed in greater detail below in reference to FIG. 3. After block 104, the method 100 proceeds to block 106.

At block 106, the vehicle controller 14 determines a vehicle mass, vehicle height, and vehicle width of the vehicle 12. Block 106 will be discussed in greater detail below in reference to FIG. 4. After block 106, the method 100 proceeds to block 108.

At block 108, the vehicle controller 14 determines whether a navigation request has been received from an occupant of the vehicle 12. In the scope of the present disclosure, the navigation request is a request made by the occupant of the vehicle to use the GNSS 16 to provide navigation directions to a requested destination. In a non-limiting example, the occupant of the vehicle 12 may use a human-machine interface (not shown) of the vehicle 12 to input the requested destination in the form of a street address. If a navigation request has been received from occupant of the vehicle, the method 100 is determined to be in a guided navigation mode and the method 100 proceeds to block 110. If a navigation request has not been received from occupant of the vehicle, the method 100 is determined to be in a free navigation mode and the method 100 proceeds to block 112, as will be discussed in greater detail below.

At block 110, the vehicle controller 14 uses the GNSS 16 to determine the geographical location of the vehicle 12. After block 110, the method 100 proceeds to block 114.

At block 114, the vehicle controller 14 uses the vehicle communication system 20 to transmit the geographical location of the vehicle 12 determined at block 110, the vehicle mass, vehicle height, and vehicle width determined at block 106, and the navigation request received at block 108 to the server system 28 via the server communication system 34. After block 114, the method 100 proceeds to block 116.

At block 116, the server system 28 selects a navigation route. Block 116 will be discussed in more detail below in reference to FIG. 5A. After block 116, the method 100 proceeds to block 118.

At block 118, the vehicle controller 14 receives the navigation route selected by the server system at block 116 from the server system 28 using the vehicle communication system 20. After block 118, the method 100 proceeds to block 120.

At block 120, the vehicle controller 14 receives feedback using the plurality of vehicle sensors 18 and transmits the feedback to the server system 28. The double dotted line 122 indicates the feedback being sent to the server system 28 and thus influencing the operation of block 104. Block 120 will be discussed in greater detail below in reference to FIG. 6. After block 120, the method 100 proceeds to enter a standby state at block 124.

As discussed above, at block 108, if a navigation request has not been received from occupant of the vehicle, the method 100 is determined to be in a free navigation mode and the method 100 proceeds to block 112.

At block 112, the vehicle controller 14 uses the GNSS 16 to determine the geographical location of the vehicle 12. After block 110, the method 100 proceeds to block 126.

At block 126, the vehicle controller 14 uses the vehicle communication system 20 to transmit the geographical location of the vehicle 12 determined at block 112 and the vehicle mass, vehicle height, and vehicle width determined at block 106 to the server system 28 via the server communication system 34. After block 126, the method 100 proceeds to block 128.

At block 128, the server system 28 determines a segment propulsion comfort score and a segment grade comfort score of a road segment near the vehicle 12. The segment propulsion comfort score, segment grade comfort score, and block 128 will be discussed in more detail below in reference to FIG. 5B. After block 128, the method 100 proceeds to block 130.

At block 130, the vehicle controller 14 receives the segment propulsion comfort score and the segment grade comfort score of the road segment near the vehicle 12 determined by the server system at block 128 from the server system 28 using the vehicle communication system 20. After block 130, the method 100 proceeds to block 132.

At block 132, the vehicle controller 14 compares the segment propulsion comfort score of the road segment near the vehicle 12 received at block 130 to a predetermined segment propulsion comfort score threshold and the segment grade comfort score of the road segment near the vehicle 12 received at block 130 to a predetermined segment grade comfort score threshold. If the segment propulsion comfort score of the road segment near the vehicle 12 is less than or equal to the predetermined segment propulsion comfort score threshold and/or the segment grade comfort score of the road segment near the vehicle 12 is less than or equal to the predetermined segment grade comfort score threshold, the method 100 proceeds to block 134. Otherwise, the method 100 bypasses block 134 and proceeds to block 120.

At block 134, the vehicle controller 14 uses the human-machine interface (not shown) of the vehicle 12 to notify the occupant of the vehicle 12 that segment propulsion comfort score of the road segment near the vehicle 12 is less than or equal to the predetermined segment propulsion comfort score threshold and/or the segment grade comfort score of the road segment near the vehicle 12 is less than or equal to the predetermined segment grade comfort score threshold. It should be understood that various types of human-machine interface including, for example, a dashboard display, a center console display, a head-up display (HUD), and the like are within the scope of the present disclosure. After block 134, the method 200 proceeds to block 120. As described above, after block 120, the method 100 proceeds to enter a standby state at block 124.

Figure 3:
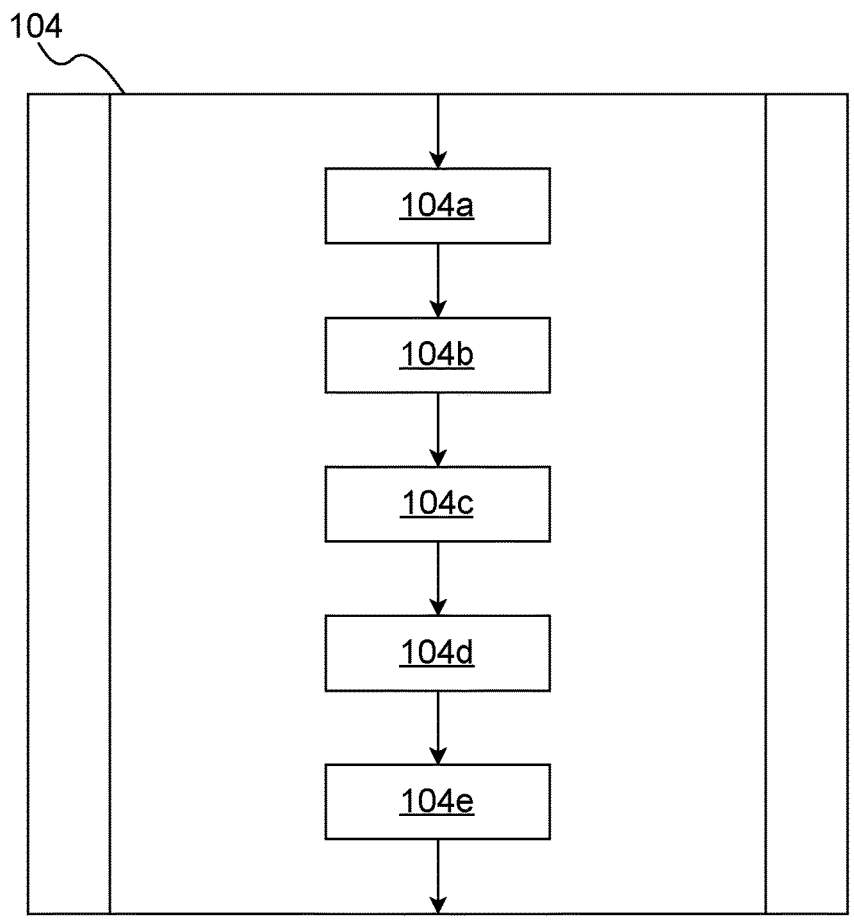
FIG. 3 is a flowchart of a method for populating a database according to an exemplary embodiment.

Referring to FIG. 3, a flowchart of an exemplary embodiment of the block 104 discussed above is provided. The exemplary embodiment of block 104 begins at block 104*a*. At block 104*a*, the server controller 30 receives a performance data set for one of the plurality of road segments from one of a plurality of vehicles. In a non-limiting example, the performance data set includes a location of a road segment and at least one of a plurality of values: a motor speed, a motor torque, an electric drive motor voltage and/or current, an accelerator pedal position, a coolant temperature, a cooling fan speed, a transmission oil temperature, an ambient air temperature, a barometric pressure, a vehicle mass, a vehicle height, and a vehicle width.

In an exemplary embodiment, the plurality of vehicles includes any vehicle equipped with sensors (e.g., the plurality of vehicle sensors 18). When traversing each of the plurality of road segments, each of the plurality of vehicles records a performance data set using the sensors and transmits the performance data set to the server system 28 to be received at block 104*a*.

In an exemplary embodiment, the performance data set includes multiple measurements of the plurality of values recorded while traversing the segment. In another exemplary embodiment, the performance data set includes an average of each of the plurality of values while traversing the segment. In yet another exemplary embodiment, each of the plurality of values further includes a low threshold and a high threshold. In the scope of the present disclosure, values below the low threshold are values where the occupant feels no discomfort. Values between the low and high thresholds are values where the occupant begins to feel discomfort and/or stress. Values above the high threshold are values where the occupant feels extreme discomfort and/or stress. For example, if an engine speed is above an exemplary high threshold of three thousand revolutions per minute, the occupant may experience discomfort due to loud noise and thus perceived strain on the engine. In an exemplary embodiment, the low and high thresholds of each of the plurality of values is determined based on empirical study, occupant feedback, and vehicle equipment (e.g., engine size). After block 104a, the exemplary embodiment of block 104 proceeds to block 104b.

At block 104b, the server controller 30 determines a vehicle class associated with the performance data set received at block 104a (i.e., a vehicle class of a vehicle which transmitted the performance data set received at block 104a). In the scope of the present disclosure, the vehicle class is a categorization of a vehicle based on a vehicle mass, vehicle height, and vehicle width. In an exemplary embodiment, multiple vehicle classes are defined, for example, light-duty, medium-duty, and heavy-duty. Vehicles having a relatively small mass (e.g., 1100 kilograms) and/or a relatively small frontal cross-sectional area (as estimated based on the vehicle height and vehicle width, e.g., 2.1 square meters) are categorized as light-duty class vehicles. Vehicles having an average mass (e.g., 1900 kilograms) and/or an average frontal cross-sectional area (e.g., 2.2 square meters) are categorized as medium-duty class vehicles. Vehicles having a relatively large mass (e.g., 2500 kilograms) and/or a relatively large frontal cross-sectional area (e.g., 2.5 square meters) are categorized as heavy-duty class vehicles. After block 104b, the exemplary embodiment of block 104 proceeds to block 104c.

At block 104c, the server controller 30 normalizes the performance data set received at block 104a. In an exemplary embodiment, each of the plurality of values of the performance data set is normalized using the low and high thresholds discussed above to generate a normalized performance data set. For example, if one of the plurality of values is greater than or equal to the high threshold for the one of the plurality of values, the result of the normalization is one. If the one of the plurality of values is between the low and high threshold for the one of the plurality of values, the result of the normalization is one half. If the one of the plurality of values is less than or equal to the low threshold for the one of the plurality of values, the result of the normalization is zero. After block 104c, the exemplary embodiment of block 104 proceeds to block 104d.

At block 104d, each of the plurality of values of the normalized performance data set is weighted to generate a weighted normalized performance data set. In an exemplary embodiment, each of the plurality of values of the normalized performance data set is multiplied by one of a plurality of predetermined weights. In a non-limiting example, the plurality of predetermined weights is stored in the server media 38 and each of the plurality of predetermined weights is determined based at least in part on empirical study and/or occupant feedback. For example, accelerator pedal position may more heavily influence occupant comfort than engine coolant temperature. Thus, accelerator pedal position is multiplied by a higher weight than engine coolant temperature. After block 104d, the exemplary embodiment of block 104 proceeds to block 104e.

At block 104e, the server controller 30 generates one of the plurality of segment propulsion comfort records. As discussed above, each of the plurality of segment propulsion comfort records corresponds to one of the plurality of road segments. Each of the plurality of segment propulsion records includes a location attribute, a vehicle class attribute, and a propulsion comfort score attribute. The location attribute of the one of the plurality of segment propulsion records is the location of the road segment for which the performance data set was received at block 104a. The vehicle class attribute of the one of the plurality of segment propulsion records is the vehicle class of the vehicle which transmitted the performance dataset, as determined at block 104b. The propulsion comfort score attribute is a propulsion comfort score for the road segment. The propulsion comfort score for the road segment is a sum of the plurality of values of the weighted normalized performance data set determined at block 104d. In the scope of the present disclosure, the propulsion comfort score for a road segment (also called the segment propulsion comfort score) is a quantification of a comfort level of an occupant while traversing the road segment. More particularly, the segment propulsion comfort score quantifies an extent to which an occupant feels discomfort due to a propulsion system (i.e., drivetrain) of the vehicle 12 while traversing the road segment. For example, road segments having a steep grade angle, and/or requiring merging into higher speed traffic may cause stress on the propulsion system of the vehicle and thus discomfort to the occupant and therefore a lower segment propulsion comfort score. After block 104e, the exemplary embodiment of block 104 is concluded and the method 100 proceeds as described above.

It should be understood that the exemplary embodiment of block 104 is performed repeatedly with the plurality of vehicles traversing the plurality of road segments. For example, the plurality of vehicles is equipped with sensors (e.g., the plurality of vehicle sensors 18). When traversing each of the plurality of road segments, each of the plurality of vehicles records a performance data set using the sensors and transmits the performance data set to the server system 28 to be received at block 104a. Therefore, the database 32 is populated using crowdsourcing, because many vehicles contribute to the plurality of segment propulsion comfort records. In an exemplary embodiment, for segment propulsion comfort records having a same vehicle class attribute and a same location attribute, the propulsion comfort scores are averaged in the database 32. Thus, each of the plurality of segment propulsion comfort records in the database 32 represents an aggregation of all performance data sets received from each of the plurality of vehicles having the same vehicle class which have traversed a given road segment and provided a performance data set.

Figure 4:
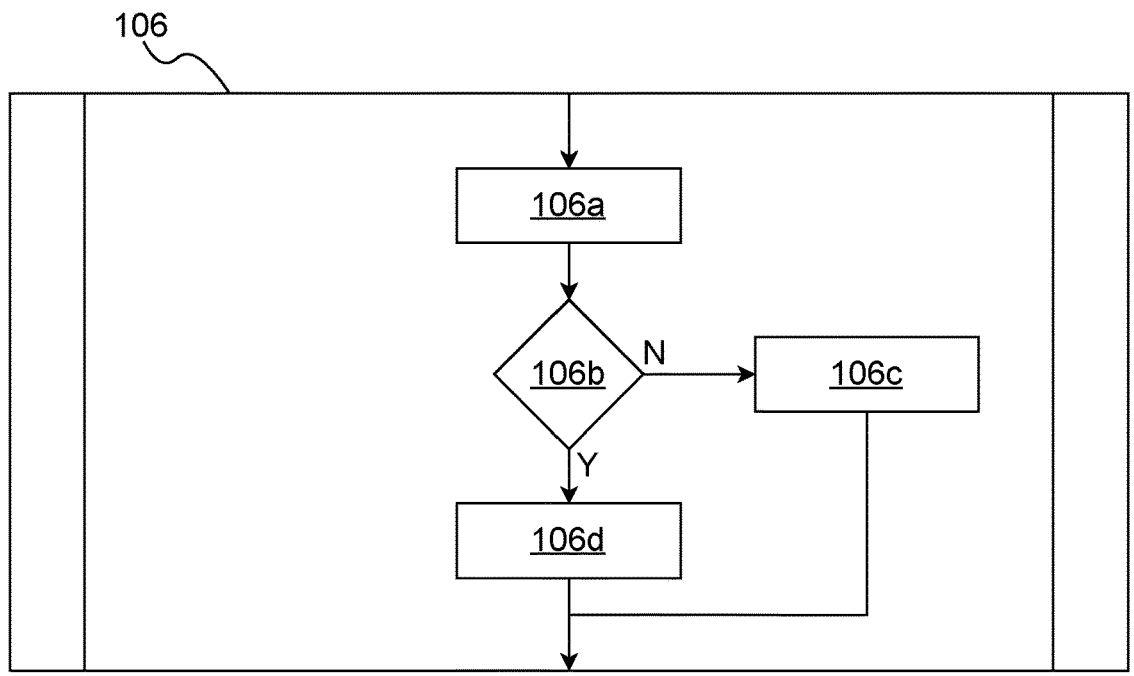
FIG. 4 is a flowchart of a method for determining vehicle characteristics according to an exemplary embodiment.

Referring to FIG. 4, a flowchart of an exemplary embodiment of the block 106 discussed above is provided. At block 106a, the vehicle controller 14 retrieves a predetermined mass of the vehicle 12, a predetermined height of the vehicle 12, and a predetermined width of the vehicle 12 from the media 24 of the vehicle controller 14. In the scope of the present disclosure, the predetermined mass, height, and width are the mass, height, and width of the vehicle 12 as originally manufactured, without any additional modifications and/or attachments (e.g., a trailer, bike rack, cargo rack, and/or the like). After block 106a, the exemplary embodiment of block 106 proceeds to block 106b.

At block 106b, the vehicle controller 14 determines a towing status of the vehicle 12. In the scope of the present disclosure, the towing status the vehicle 12 defines whether a trailer is currently connected to the vehicle 12. If a trailer is currently connected to the vehicle 12, the towing status is a trailering status. If a trailer is not currently connected to the vehicle 12, the towing status is a non-trailering status. In an exemplary embodiment, to determine the towing status of the vehicle 12, the vehicle controller 14 determines whether an electrical connection is present between the vehicle 12 and a trailer. In another exemplary embodiment, the vehicle controller 14 uses the human-machine interface (not shown) to prompt the occupant for the towing status of the vehicle 12. If no trailer is currently connected to the vehicle 12 (i.e., the non-trailering status), the exemplary embodiment of block 106 proceeds to block 106c. If a trailer is currently connected to the vehicle 12 (i.e., the trailering status), the exemplary embodiment of block 106 proceeds to block 106d.

At block 106c, a vehicle mass is determined to be equal to the predetermined mass of the vehicle 12 retrieved at block 106a. A vehicle height is determined to be equal to the predetermined height of the vehicle 12 retrieved at block 106a. A vehicle width is determined to be equal to the predetermined width of the vehicle 12 retrieved at block 106a. In the scope of the present disclosure, the vehicle mass is a mass of the vehicle 12 and/or the mass of any attachment (e.g., a trailer, bike rack, cargo rack, and/or the like) connected to the vehicle 12. The vehicle height is a height of the vehicle 12 and/or the height of any attachment (e.g., a trailer, bike rack, cargo rack, and/or the like) connected to the vehicle 12. The vehicle width is a width of the vehicle 12 and/or the width of any attachment (e.g., a trailer, bike rack, cargo rack, and/or the like) connected to the vehicle 12. After block 106c, the exemplary embodiment of block 106 is concluded and the method 100 proceeds as described above.

At block 106d, the vehicle controller 14 requests a trailer mass, a trailer height, and a trailer width of the trailer which is currently connected to the vehicle 12 from the occupant of the vehicle 12. In an exemplary embodiment, the vehicle controller 14 uses the human-machine interface (not shown) of the vehicle 12 to display a prompt to the occupant of the vehicle 12 requesting the trailer mass, height, and width. The vehicle mass is determined to be a sum of the predetermined mass of the vehicle retrieved at block 106a and the trailer mass. If the trailer height is greater than or equal to the predetermined height of the vehicle retrieved at block 106a, the vehicle height is determined to be equal to the trailer height. If the trailer height is less than the predetermined height of the vehicle retrieved at block 106a, the vehicle height is determined to be equal to the predetermined height of the vehicle retrieved at block 106a. If the trailer width is greater than or equal to the predetermined width of the vehicle retrieved at block 106a, the vehicle width is determined to be equal to the trailer width. If the trailer width is less than the predetermined width of the vehicle retrieved at block 106a, the vehicle width is determined to be equal to the predetermined width of the vehicle retrieved at block 106a. After block 106d, the exemplary embodiment of block 106 is concluded and the method 100 proceeds as described above.

Figure 5A:
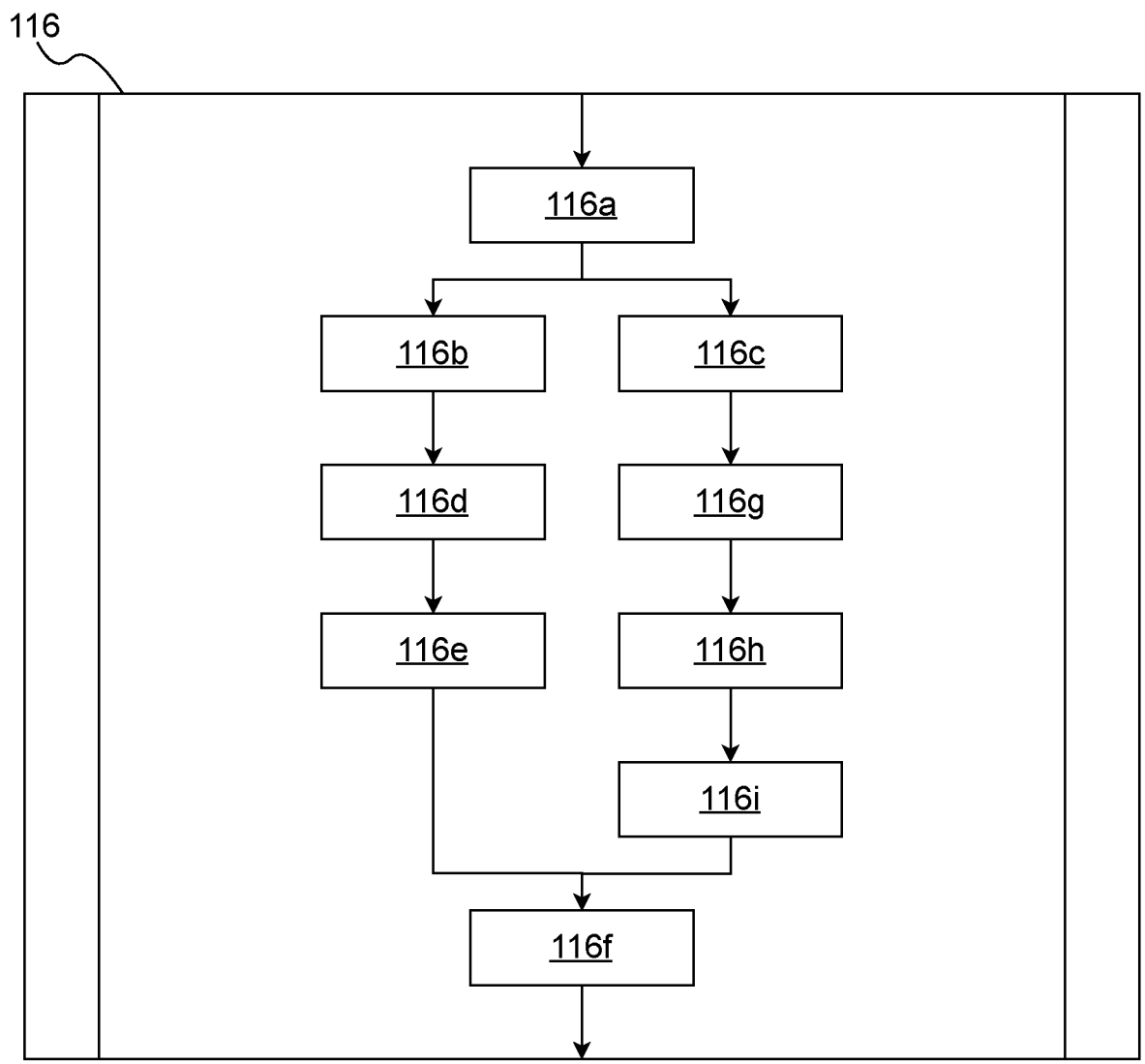
FIG. 5A is a flowchart of a method for selecting a navigation route according to an exemplary embodiment.

Referring to FIG. 5A, a flowchart of an exemplary embodiment of the block 116 discussed above is provided. The exemplary embodiment of block 116 begins at block 116a. At block 116a, the server controller 30 determines a plurality of possible routes based on the location and the navigation request transmitted by the vehicle 12 at block 114. In an exemplary embodiment, the plurality of possible routes is determined based on a server map contained in the server media 38 or otherwise accessible by the server controller 30 (e.g., accessible using the server communication system 34). The server map includes information about infrastructure such as municipality borders, roadways, railways, sidewalks, buildings, and the like. In an exemplary embodiment, the server map also includes a road grade angle and a road speed limit for each of the plurality of road segments. In a non-limiting example, the server map is used, along with the geographical location of the vehicle and the navigation request, to generate a plurality of possible routes to satisfy the navigation request. After block 116a, the exemplary embodiment of block 116 proceeds to blocks 116b and 116c.

At block 116b, the server controller 30 determines the vehicle class of the vehicle 12 based at least in part on the vehicle mass, vehicle height, and vehicle width transmitted by the vehicle 12 at block 114. Determination of vehicle class is discussed in greater detail above in reference to block 104b. After block 116b, the exemplary embodiment of block 116 proceeds to block 116d.

At block 116d, the server controller 30 retrieves a subset of the plurality of segment propulsion comfort records generated at block 104e. The location attribute of each of the subset of the plurality of segment propulsion comfort records is located along one of the plurality of possible routes determined at block 116a. The vehicle class attribute of each of the subset of the plurality of segment propulsion comfort records matches the vehicle class of the vehicle 12 determined at block 116b. After block 116d, the exemplary embodiment of block 116 proceeds to block 116e.

At block 116e, the server controller 30 determines a route propulsion comfort score for each of the plurality of possible routes. In the scope of the present disclosure, the route propulsion comfort score is a quantification of a comfort level of an occupant while traversing a given route. More particularly, the route propulsion comfort score quantifies an extent to which an occupant feels discomfort due to a propulsion system (i.e., drivetrain) of the vehicle 12 while traversing the given route. In an exemplary embodiment, to determine a route propulsion comfort score for each of the plurality of possible routes, the server controller 30 sums the propulsion comfort score attribute of each of the subset of the plurality of segment propulsion comfort records along each of the plurality of possible routes, resulting in a route propulsion comfort score for each of the plurality of possible routes. In other words, for a given route, the route propulsion comfort score of the given route is a sum of the segment propulsion comfort scores of each road segment located along the given route. After block 116e, the exemplary embodiment of block 116 proceeds to block 116f, as will be discussed below.

As discussed above, after block 116a, the exemplary embodiment of block 116 proceeds to blocks 116b and 116c. At block 116c, the server controller 30 determines a road speed limit and a road grade angle for each of a subset of the plurality of road segments. Each subset of the plurality of road segments is located along one of the plurality of possible routes. As discussed above, the road speed limit and road grade angle for each of the plurality of road segments is included in the server map accessible by the server controller 30. After block 116*c*, the exemplary embodiment of block 116 proceeds to block 116*g*.

At block 116*g*, the server controller 30 determines an estimated power required by the vehicle 12 to traverse each of the subset of the plurality of road segments. In the scope of the present disclosure, the estimated power is a sum of an air drag power (i.e., a power required to maintain the road speed limit against air resistance), a rolling power (i.e., a power required maintain the road speed limit against rolling resistance), and a grade power (i.e., a power required to maintain the road speed limit against gravitational force due to the road grade angle). In an exemplary embodiment, to calculate the estimated power for each of the subset of the plurality of road segments, the server controller 30 uses an estimated power model:

$$P_{est} = \left(\frac{C_d * \rho_a * v^3}{2}\right) * A + (C_{rr} * g * v) * M + (v * g * \sin\alpha) * M$$

where $P_{est}$ is the estimated power, $C_d$ is a coefficient of drag of the vehicle, $\rho_a$ is an air density in an environment surrounding the vehicle, $v$ is the road speed limit of one of the subset of the plurality of road segments, A is a frontal cross-sectional area of the vehicle (i.e., the vehicle height multiplied by the vehicle width), $C_{rr}$ is a coefficient of rolling resistance of the vehicle, g is a gravitational constant, M is the vehicle mass, and $\alpha$ is the road grade angle of the one of the subset of the plurality of road segments.

In an exemplary embodiment, calculation of the estimated power for each of the subset of the plurality of road segments is computationally intensive. Therefore, in a non-limiting example, the server controller 30 uses at least one precalculated lookup table to calculate the estimated power model. For example, a first lookup table contains the air drag power per unit frontal cross-sectional area for a plurality of road speed limits. A second lookup table contains a sum of the rolling power and grade power per unit vehicle mass for a plurality of combinations of road speed limit and road grade angle. Therefore, using the vehicle frontal cross-sectional area, the road speed limit, the vehicle mass, and the road grade angle, a result of the first and second lookup tables is calculated. The sum of the results of the first and second lookup tables is the estimated power to traverse a given road segment. After block 116*g*, the exemplary embodiment of block 116 proceeds to block 116*h*.

At block 116*h*, a segment grade comfort score is determined for each of the subset of the plurality of road segments. In the scope of the present disclosure, the segment grade comfort score is a quantification of a comfort level of an occupant while traversing the road segment. More particularly, the segment grade comfort score quantifies an extent to which an occupant feels discomfort due to the road grade angle along a given road segment. To determine the segment grade comfort score, a vehicle power ratio is calculated for each of the each of the subset of the plurality of road segments. In the scope of the present disclosure, the vehicle power ratio is a ratio between the estimated power required to traverse each of the subset of the plurality of road segments and a maximum power of a powertrain of the vehicle 12. In an exemplary embodiment, the maximum power of the powertrain of the vehicle 12 is stored in the server media 38. To calculate the vehicle power ratio for each of the subset of the plurality of road segments, the server controller 30 divides the estimated power for each of the subset of the plurality of road segments determined at block 116*g* by the maximum power of the powertrain of the vehicle 12. The segment grade comfort score for each of the subset of the plurality of road segments is based at least in part on the vehicle power ratio for each of the subset of the plurality of road segments. In a non-limiting example, the segment grade comfort score for each of the subset of the plurality of road segments is proportional to the vehicle power ratio for each of the subset of the plurality of road segments. In another non-limiting example, the segment grade comfort score for each of the subset of the plurality of road segments is determined using a lookup table mapping a plurality of vehicle power ratio values to a plurality of segment grade comfort score values. It should be understood that the relationship between the vehicle power ratio for each of the subset of the plurality of road segments and the segment grade comfort score for each of the subset of the plurality of road segments may be described using a variety of mathematical functions, including, for example, a linear relation, an exponential relation, a logarithmic relation, a radical relation, and/or the like. After block 116*h*, the exemplary embodiment of block 116 proceeds to block 116*i*.

At block 116*i*, the server controller 30 determines a route grade comfort score for each of the plurality of possible routes. In the scope of the present disclosure, the route grade comfort score is a quantification of a comfort level of an occupant while traversing a given route. More particularly, the route grade comfort score quantifies an extent to which an occupant feels discomfort due to the road grade angle along a given route. In an exemplary embodiment, to determine a route grade comfort score for each of the plurality of possible routes, the server controller 30 sums the segment grade comfort score for each of the subset of the plurality of road segments along each of the plurality of possible routes, resulting in a route grade comfort score for each of the plurality of possible routes. In other words, for a given route, the route grade comfort score of the given route is a sum of the segment grade comfort scores of each road segment located along the given route. After block 116*i*, the exemplary embodiment of block 116 proceeds to block 116*f*.

At block 116*f*, the server controller 30 selects a navigation route from the plurality of possible routes based at least in part on the route propulsion comfort score for each of the plurality of possible routes determined at block 116*e* and the route grade comfort score for each of the plurality of possible routes determined at block 116*i*. The server controller 30 transmits the navigation route to the vehicle controller 14 using the server communication system 34. In the scope of the present disclosure, the navigation route is one of the plurality of routes which is selected as an optimal route to be presented to the occupant of the vehicle 12 to accommodate the navigation request received at block 108. It should be understood that various factors in addition to the route propulsion comfort score and the route grade comfort score may be used to select the navigation route, for example, traffic conditions, lane edge condition (i.e., condition of lane markings or road shoulder), lane width, obstacle heights (i.e., height of obstacles in relation to a vehicle height), and turn complexity (e.g., high turning angle, complex intersection geometry, and the like) along each of the plurality of possible routes. In an exemplary embodiment, each of the plurality of routes is scores based on a plurality of the aforementioned factors, the scores are normalized, the normalized scores are weighted, and the navigation route is selected based on the plurality of normalized weighted scores for the plurality of aforementioned factors. After block 116f, the exemplary embodiment of block 116 is concluded and the method 100 proceeds as described above.

Figure 5B:
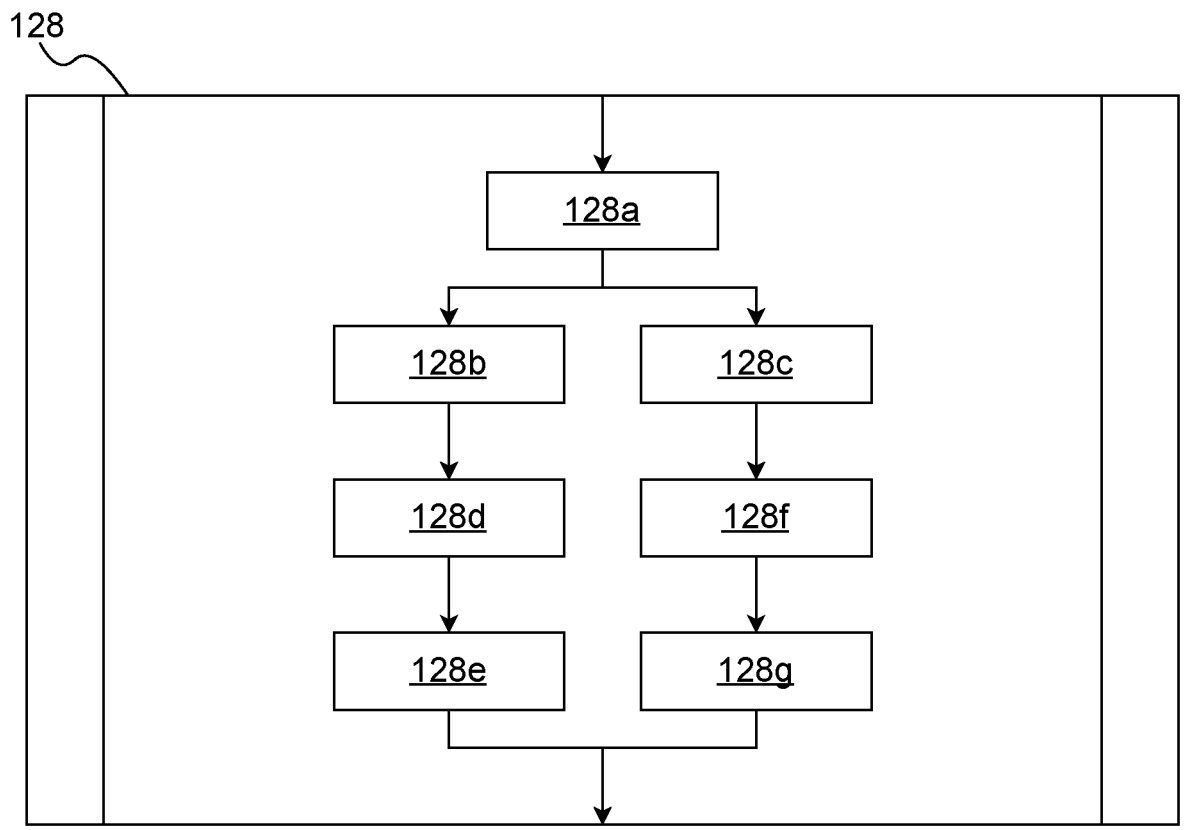
FIG. 5B is a flowchart of a method for determining a segment propulsion comfort score and a segment grade comfort score of a road segment near the vehicle according to an exemplary embodiment.

Referring to FIG. 5B, a flowchart of an exemplary embodiment of the block 128 discussed above is provided. The exemplary embodiment of block 128 begins at block 128a. At block 128a, the server controller 30 identifies one of the plurality of road segments which is near the geographical location of the vehicle 12 transmitted to the server system 28 by the vehicle 12 at block 126 (i.e., a nearby road segment). After block 128a, the exemplary embodiment of block 128 proceeds to blocks 128b and 128c.

At block 128b, the server controller 30 determines the vehicle class of the vehicle 12 based at least in part on the vehicle mass, vehicle height, and vehicle width transmitted by the vehicle 12 at block 126. After block 128b, the exemplary embodiment of block 128 proceeds to block 128d.

At block 128d, the server controller 30 retrieves one of the plurality of segment propulsion comfort records generated at block 104e. The one of the plurality of segment propulsion comfort records corresponds to the nearby road segment identified at block 128a. After block 128d, the exemplary embodiment of block 128 proceeds to block 128e.

At block 128e, the server controller 30 determines the segment propulsion comfort score of the nearby road segment to be the propulsion comfort score attribute of the one of the plurality of segment propulsion comfort records retrieved at block 128d.

As discussed above, after block 128a, the exemplary embodiment of block 128 proceeds to blocks 128b and 128c. At block 128c, the server controller 30 determines a road speed limit and a road grade angle for the nearby road segment. As discussed above, the road speed limit and road grade angle for each of the plurality of road segments is included in the server map accessible by the server controller 30. After block 128c, the exemplary embodiment of block 128 proceeds to block 128f.

At block 128f, the server controller 30 determines an estimated power required by the vehicle 12 to traverse the nearby road segment, as discussed above in reference to block 116g. After block 128f, the exemplary embodiment of block 128 proceeds to block 128g.

At block 128g, a segment grade comfort score is determined for the nearby road segment as discussed above in reference to block 116h. After blocks 128e and 128g, the exemplary embodiment of block 128 is concluded and the method 100 proceeds as described above.

Figure 6:
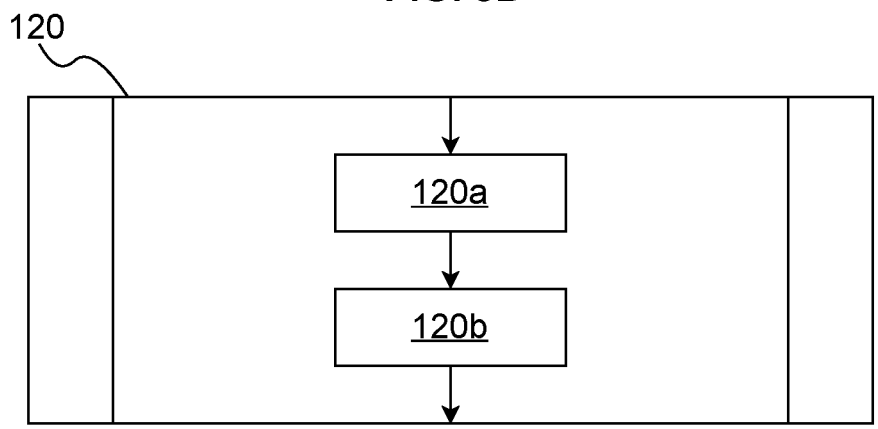
FIG. 6 is a flowchart of a method for receiving feedback according to an exemplary embodiment.

Referring to FIG. 6, a flowchart of an exemplary embodiment of the block 120 discussed above is provided. The exemplary embodiment of block 120 begins at block 120a. At block 120a, the vehicle controller 14 uses the plurality of vehicle sensors 18 to record performance data about the vehicle 12. The GNSS 16 is used to determine the location of the vehicle 12 (i.e., one of the plurality of road segments where the vehicle 12 is located). In an exemplary embodiment, the performance data includes at least one of: a motor speed, a motor torque, an electric drive motor voltage and/or current, an accelerator pedal position, a coolant temperature, a cooling fan speed, a transmission oil temperature, an ambient air temperature, a barometric pressure, a vehicle mass, a vehicle height, and a vehicle width of the vehicle 12. After block 120a, the exemplary embodiment of block 120 proceeds to block 120b.

At block 120b, the plurality of predetermined weights used at block 104d are adjusted based on the performance data recorded at block 120a. In an exemplary embodiment, if the performance data indicates that the occupant of the vehicle 12 drove below the road speed limit because of discomfort and/or stress caused by the propulsion system, the plurality of predetermined weights are adjusted to change a sensitivity of the propulsion comfort score. After block 120b, the exemplary embodiment of block 120 is concluded and the method 100 proceeds as described above.

The system 10 and method 100 of the present disclosure offer several advantages. By creating and maintaining the database 32 as described above in reference to block 104, the database 32 may be frequently populated and updated by the plurality of vehicles, leading to increased coverage and accuracy. Additionally, calculating route propulsion comfort score and the route grade comfort score for a plurality of routes allows occupant comfort to be increased by selecting a route which is more comfortable for the occupant, using, for example, the method 100. In an additional advantage, the method 100 notifies the occupant of areas of the roadway with segment propulsion comfort scores and/or segment grade comfort scores, increasing occupant awareness and mitigating opportunities for collision.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for routing a vehicle based on roadway characteristics, the system comprising:
   a global navigation satellite system (GNSS) for determining a geographical location of the vehicle;
   a vehicle communication system for communicating with server systems; and
   a vehicle controller in electrical communication with the GNSS and the vehicle communication system, wherein the vehicle controller is programmed to:
   determine a vehicle mass, vehicle height, and vehicle width, wherein to determine the vehicle mass, vehicle height, and vehicle width, the vehicle controller is further programmed to:
   retrieve a predetermined mass of the vehicle, a predetermined height of the vehicle, and a predetermined width of the vehicle from a non-transitory memory of the vehicle controller;
   determine a towing status of the vehicle, wherein the towing status includes a trailering status and a non-trailering status;
   prompt an occupant of the vehicle to provide a trailer weight, a trailer height, and a trailer width in response to determining that the towing status is the trailering status;
   determine the vehicle mass to be the predetermined mass of the vehicle, the vehicle height to be the predetermined height of the vehicle, and the vehicle width to be the predetermined width of the vehicle in response to determining that the trailering status is the non-trailering status; and
   determine the vehicle mass to be a sum of the predetermined mass of the vehicle and the trailer weight, the vehicle height to be a larger of the predetermined height of the vehicle and the trailer height, and the vehicle width to be a larger of the predetermined width of the vehicle and the trailer width in response to determining that the trailering status is the trailering status;

receive a navigation request from an occupant of the vehicle; and determine a navigation route using at least the GNSS and the vehicle communication system in response to receiving the navigation request, wherein the navigation route is based at least in part on the vehicle mass, vehicle height, and vehicle width.

2. The system of claim 1, wherein to determine the navigation route, the vehicle controller is further programmed to:

determine the geographical location of the vehicle using the GNSS;

transmit the geographical location of the vehicle, the navigation request, the vehicle mass, the vehicle height, and the vehicle width to a server controller using the vehicle communication system; and receive the navigation route from the server controller using the vehicle communication system.

3. The system of claim 2, wherein the server controller is programmed to:

determine a plurality of possible routes based at least in part on the geographical location of the vehicle, wherein each of the plurality of possible routes satisfies the navigation request;

determine a route propulsion comfort score for each of the plurality of possible routes; and select the navigation route from the plurality of possible routes based at least in part on the route propulsion comfort score for each of the plurality of possible routes.

4. The system of claim 3, wherein server controller is in electrical communication with a database, wherein the database contains a plurality of segment propulsion comfort records, each of the plurality of segment propulsion comfort records corresponding to one of a plurality of road segments of a plurality of roadways, and wherein each of the plurality of segment propulsion comfort records has a location attribute, a vehicle class attribute, and a propulsion comfort score attribute.

5. The system of claim 4, wherein to determine the route propulsion comfort score for each of the plurality of possible routes, the server controller is further programmed to:

determine a vehicle class of the vehicle based at least in part on the vehicle mass, the vehicle height, and the vehicle width;

retrieve a subset of the plurality of segment propulsion comfort records from the database, wherein the location of each of the subset of the plurality of segment propulsion comfort records is located along one of the plurality of possible routes, and wherein the vehicle class of each of the subset of the plurality of segment propulsion comfort records matches the vehicle class of the vehicle; and determine the route propulsion comfort score for each of the plurality of possible routes by summing the propulsion comfort score of each of the subset of the plurality of segment propulsion comfort records along each of the plurality of possible routes.

6. The system of claim 4, wherein the database is populated by generating the plurality of segment propulsion comfort records, and wherein to generate one of the plurality of segment propulsion comfort records, the server controller is further programmed to:

receive one of a plurality of performance data sets for one of the plurality of road segments from at least one vehicle;

determine a vehicle class of the at least one vehicle;

calculate one of a plurality of normalized performance data sets by normalizing the one of the plurality of performance data sets;

calculate one of a plurality of weighted normalized performance data sets by multiplying the one of the plurality of normalized performance data sets by a plurality of predetermined weights; and generate the one of the plurality of segment propulsion comfort records, wherein the location of the one of the plurality of segment propulsion comfort records is the location of the one of the plurality of road segments, wherein the vehicle class of the one of the plurality of segment propulsion comfort records is the vehicle class of the at least one vehicle, and wherein the propulsion comfort score of the one of the plurality of segment propulsion comfort records is a sum of the one of the plurality of weighted normalized performance data sets.

7. The system of claim 4, wherein the server controller is further programmed to:

determine a route grade comfort score for each of the plurality of possible routes; and select the navigation route from the plurality of possible routes based at least in part on the route propulsion comfort score and the route grade comfort score for each of the plurality of possible routes.

8. The system of claim 7, wherein to determine the route grade comfort score for each of the plurality of possible routes, the server controller is further programmed to:

retrieve a road speed limit and a road grade angle for each of the plurality of road segments;

determine a segment grade comfort score for each of the plurality of road segments of each of the plurality of possible routes based at least in part on a vehicle power ratio for each of the plurality of road segments of each of the plurality of possible routes; and determine the route grade comfort score for each of the plurality of possible routes based at least in part on the segment grade comfort score for each of the plurality of road segments of each of the plurality of possible routes.

9. The system of claim 8, wherein to calculate the vehicle power ratio for one of the plurality of road segments of the plurality of possible routes, the server controller is further programmed to:

determine a maximum power of a powertrain of the vehicle;

calculate an estimated power to traverse the one of the plurality of road segments of the plurality of possible routes using an estimated power model:

$$P_{est} = \left(\frac{C_d * \rho_a * v^3}{2}\right) * A + (C_{rr} * g * v) * M + (v * g * \sin \alpha) * M$$

wherein $P_{est}$ is the estimated power, $C_d$ is a coefficient of drag of the vehicle, $\rho_a$ is an air density in an environment surrounding the vehicle, $v$ is the road speed limit of the one of the plurality of road segments, A is a frontal cross-sectional area of the vehicle, $C_{rr}$ is a coefficient of rolling resistance of the vehicle, g is a gravitational constant, M is the vehicle mass, and $\alpha$ is the road grade angle of the one of the plurality of road segments; and calculate the vehicle power ratio for the one of the plurality of road segments of the plurality of possible routes by dividing the estimated power to traverse the one of the plurality of road segments of the plurality of possible routes by the maximum power of the powertrain of the vehicle.

10. A method for routing a vehicle based on roadway characteristics, the method comprising:
populating a database with a plurality of records, each of the plurality of records corresponding to one of a plurality of road segments, wherein each of the plurality of records has a plurality of attributes, and wherein populating the database further comprises:
receiving a plurality of performance data sets from a plurality of vehicles, wherein each of the plurality of performance data sets corresponds to one of the plurality of road segments;
calculating a plurality of normalized weighted performance data sets by normalizing the plurality of performance data sets and multiplying each of the plurality of performance data sets by a plurality of predetermined weights;
determining a vehicle class for each of the plurality of normalized weighted performance data sets based on a vehicle class of each of the plurality of vehicles;
determining a road speed limit and road grade angle of each of the plurality of road segments; and
creating the plurality of records in the database, wherein each of the plurality of records corresponds to one of the plurality of road segments;
determining a plurality of possible routes to satisfy a navigation request based at least in part on a location of the vehicle, wherein each of the plurality of possible routes includes a subset of the plurality of road segments; and
selecting a navigation route from the plurality of possible routes based at least in part on the plurality of records.

11. The method of claim 10, wherein a location attribute of each of the plurality of records is a location of the one of the plurality of road segments, a vehicle class attribute of each of the plurality of records is the vehicle class of the one of the normalized weighted performance data sets, a propulsion comfort score attribute of each of the plurality of records is based at least in part on the one of the plurality of normalized weighted performance data sets, a road speed limit attribute is the road speed limit of the one of the plurality of road segments, and a road grade angle attribute is the road grade angle of the one of the plurality of road segments.

12. The method of claim 11, wherein selecting the navigation route further comprises:
determining a route propulsion comfort score for each of the plurality of possible routes based at least in part on the plurality of records in the database;
determining a route grade comfort score for each of the plurality of possible routes based at least in part on the plurality of records in the database; and
selecting the navigation route from the plurality of possible routes based at least in part on the route propulsion comfort score for each of the plurality of possible routes and the route grade comfort score for each of the plurality of possible routes.

13. The method of claim 12, wherein determining the route propulsion comfort score for each of the plurality of possible routes further comprises:
determining a vehicle class of the vehicle based at least in part on a vehicle mass, a vehicle height, and a vehicle width;
retrieving a subset of the plurality of records from the database, wherein the location of each of the subset of the plurality of records is located along one of the plurality of possible routes, and wherein the vehicle class of each of the subset of the plurality of records matches the vehicle class of the vehicle; and
determining the route propulsion comfort score for each of the plurality of possible routes by summing the propulsion comfort score of each of the subset of the plurality of records along each of the plurality of possible routes.

14. The method of claim 13, wherein determining the route grade comfort score for each of the plurality of possible routes further comprises:
retrieving the road speed limit and the road grade angle for each of the plurality of road segments from the database;
calculating a vehicle power ratio for each of the plurality of road segments of each of the plurality of possible routes;
determining a segment grade comfort score for each of the plurality of road segments of each of the plurality of possible routes based at least in part on the vehicle power ratio for each of the plurality of road segments of each of the plurality of possible routes; and
determining the route grade comfort score for each of the plurality of possible routes based at least in part on the segment grade comfort score for each of the plurality of road segments of each of the plurality of possible routes.

15. The method of claim 14, wherein calculating a vehicle power ratio for each of the plurality of road segments further comprises:
determining a maximum power of a powertrain of the vehicle;
calculating an estimated power to traverse the one of the plurality of road segments of the plurality of possible routes using an estimated power model:

$$P_{est} = \left(\frac{C_d * \rho_a * v^3}{2}\right) * A + (C_{rr} * g * v) * M + (v * g * \sin\alpha) * M$$

wherein $P_{est}$ is the estimated power, $C_d$ is a coefficient of drag of the vehicle, $\rho_a$ is an air density in an environment surrounding the vehicle, $v$ is the road speed limit of the one of the plurality of road segments, A is a frontal cross-sectional area of the vehicle, $C_{rr}$ is a coefficient of rolling resistance of the vehicle, g is a gravitational constant, M is the vehicle mass, and $\alpha$ is the road grade angle of the one of the plurality of road segments; and
calculating the vehicle power ratio for the one of the plurality of road segments of the plurality of possible routes by dividing the estimated power to traverse the one of the plurality of road segments of the plurality of possible routes by the maximum power of the powertrain of the vehicle.

16. A system for routing a vehicle based on roadway characteristics, the system comprising:
a global navigation satellite system (GNSS) for determining a geographical location of the vehicle;
a vehicle communication system for communicating with server systems;
a plurality of vehicle sensors for measuring a plurality of performance data of the vehicle; and
a vehicle controller in electrical communication with the GNSS, the vehicle communication system, and the plurality of vehicle sensors, wherein the vehicle controller is programmed to:

determine a vehicle mass, vehicle height, and vehicle width;

receive a navigation request from an occupant of the vehicle;

determine the geographical location of the vehicle using the GNSS;

measure a performance data set of the vehicle using the plurality of vehicle sensors; and transmit the geographical location of the vehicle, the navigation request, the vehicle mass, the vehicle height, the vehicle width, and the performance data set to a server controller using the vehicle communication system, wherein the server controller is programmed to:

determine a plurality of possible routes based at least in part on the geographical location of the vehicle, wherein each of the plurality of possible routes satisfies the navigation request, and wherein each of the plurality of possible routes includes a plurality of road segments;

determine a route propulsion comfort score for each of the plurality of possible routes;

determine a route grade comfort score for each of the plurality of possible routes; and select a navigation route from the plurality of possible routes based at least in part on the route propulsion comfort score for each of the plurality of possible routes and the route grade comfort score for each of the plurality of possible routes.

17. The system of claim 16, wherein:

to determine the route propulsion comfort score for each of the plurality of possible routes the server controller is further programmed to:

determine a vehicle class of the vehicle based at least in part on the vehicle mass, the vehicle height, and the vehicle width;

retrieve a plurality of segment propulsion comfort records from a database, wherein the location of each of the plurality of segment propulsion comfort records is located along one of the plurality of possible routes, wherein each of the plurality of segment propulsion comfort records corresponds to one of the plurality of road segments, and wherein the vehicle class of each of the plurality of segment propulsion comfort records matches the vehicle class of the vehicle;

determine the route propulsion comfort score for each of the plurality of possible routes by summing the propulsion comfort score of each of the plurality of segment propulsion comfort records along each of the plurality of possible routes to determine a route grade comfort score for each of the plurality of possible routes, the server controller is further programmed to:

retrieve a road speed limit and a road grade angle for each of the plurality of road segments from the database;

determine a segment grade comfort score for each of the plurality of road segments of each of the plurality of possible routes based at least in part on a vehicle power ratio for each of the plurality of road segments of each of the plurality of possible routes; and determine the route grade comfort score for each of the plurality of possible routes based at least in part on the segment grade comfort score for each of the plurality of road segments of each of the plurality of possible routes.

18. The system of claim 17, wherein the database is populated by generating a plurality of segment propulsion comfort records, and wherein to generate one of the plurality of segment propulsion comfort records, the server controller is further programmed to:

receive one of a plurality of performance data sets for one of the plurality of road segments from at least one vehicle;

determine a vehicle class of the at least one vehicle;

calculate one of a plurality of normalized performance data sets by normalizing the one of the plurality of performance data sets;

calculate one of a plurality of weighted normalized performance data sets by multiplying the one of the plurality of normalized performance data sets by a plurality of predetermined weights; and generate the one of the plurality of segment propulsion comfort records, wherein the location of the one of the plurality of segment propulsion comfort records is the location of the one of the plurality of road segments, wherein the vehicle class of the one of the plurality of segment propulsion comfort records is the vehicle class of the at least one vehicle, and wherein the propulsion comfort score of the one of the plurality of segment propulsion comfort records is a sum of the one of the plurality of weighted normalized performance data sets.

\* \* \* \* \*